Patented Nov. 7, 1933

1,934,642

UNITED STATES PATENT OFFICE 1,934,642

CLAY

Harold Robert Rafton, Andover, Mass., assignor to Rafton Engineering Corporation, a corporation of Massachusetts No Drawing. Application July 18, 1930
Serial No. 468,989

13 Claims. (Cl. 91—68)

My invention relates to an improved clay.

The principal object of my invention is to provide an improved clay and paper filled and/or coated therewith.

An important object is to provide an improved clay from which oversize particles have been removed.

An important object is to provide an improved clay from which the oversize particles have been substantially completely removed.

A further object is the production of an improved paper filled with improved clay.

A further object is the production of an improved paper coated with improved clay.

Other objects and advantages will become apparent during the course of the following description.

Clay is a naturally occurring material which is normally subjected to treatment or purification prior to use. Kaolin or china clay is a comparatively pure or fine variety of clay.

My invention concerns the production of an improved quality of clay and particularly of an improved china clay or kaolin.

Clay is used for a number of purposes, particularly in the ceramic industry, e. g. in the manufacture of pottery, and the better grades, particularly kaolins, are used as filler in the arts, particularly in the paper industry. My invention concerns an improved clay and improved products made therefrom, particularly improved filled paper and improved coated paper.

The usual method for preparing clay, and particularly china clay, is to mine it, suspend it in water, subject it to purification in so-called "micas",—which are long settling troughs in which are settled out the larger particle sizes,—and then run it into settling basins where it is dewatered by sedimentation. The dewatered clay is then usually filterpressed and dried to a moisture content of around 85 to 90% or it may be practically bone dried.

Alternate methods are to use instead of the "micas" an improved continuous settling apparatus. Likewise the clay may be given in addition to the wet treatment or in lieu of it, a crushing and grinding treatment followed by air flotation.

Whatever may be the treatment to which the clay is subjected, the primary object is to remove the larger particles present in the crude material.

A microscopic examination of commercial clay indicates that whereas a large proportion of the particles are extremely fine, the particles are by no means uniform in size and there is a considerable proportion of particles ranging from the very finest up to the size of those which have just been removed by the purification process. I have found that commercial clays are subject to certain defects which are particularly noticeable when the clay is employed for filling and/or coating paper, as these defects impart certain defects to the papers made therewith. The reason for these defects was at first rather obscure but as result of an extended investigation I have found that the defects in the paper made with ordinary commercial clay are due particularly to the presence of oversize particles in the clay, which oversize particles it has not been hitherto feasible to remove in the process of preparing the clay for sale.

I have found, as stated, that in the use of clay, particularly for coating and/or filling paper, the presence of oversize particles, that is, particles larger than a certain limiting size, is the primary cause of these defects. So far as I am aware no one has previously determined this limiting particle size. By careful experimentation I have determined that this limiting particle size is approximately .001". All particles which are greater than .001" I have termed oversize particles and in this description and appended claims the term "oversize" is intended to have this meaning.

I have found that the oversize in clay is due primarily to flat particles probably mica or similar material, and only to a lesser degree to particles substantially spherical or at least of substantial thickness. Clay containing these oversize particles when used for filling or coating paper adversely effects the quality of the paper, the oversize being a source of shiny spots in the sheet which reflect the light differently, and which take calendering differently, from the remainder of the sheet.

Moreover in filling paper, the oversize particles tend to settle out, especially when the stock is in dilute suspension, cause uneven distribution of the filler throughout the sheet, particularly cause unevenness of finish in the sheet and its printing qualities, and in general tend to lower the quality of the paper made therewith. In coating paper they cause rough places and "shiners" in the coating with subsequent dusting during the drying, reeling, and calendering operations and are a cause of unevenness of finish and non-uniformity of the printing qualities of the resulting paper.

It is apparent therefore that the elimination of the oversize particles in clay is greatly to be desired. The methods of elutriation or hydroseparation used in the manufacture of clay, even with the most efficient apparatus at present available, have proven to be inefficient in removing the oversize, as all commercial clays heretofore made by hydroseparation methods have contained an amount of oversize sufficient to noticeably affect their quality. Moreover the apparatus required in the hydroseparation methods is very large and expensive, requires excessive floor or ground space, and involves reconcentration of solids from the necessarily dilute suspensions in which hydroseparation is required to be effected. Also air flotation methods have likewise proven to be incapable of producing a suitable quality of clay and in addition these methods have the disadvantage that they do not function properly when oversize particles of different specific gravity exist in the clay. Also air flotation processes require an expensive installation of apparatus.

Attempt has been previously made to reduce the so-called grit in commercial clays by grinding as in a pebble, ball or rod mill, and this method if carried far enough will completely reduce and eliminate the oversize. But in so doing it also reduces the other particle sizes with the result that the general characteristics of a clay are profoundly modified which in certain cases is very undesirable. The effect of such grinding is not to render a clay completely homogeneous as to particle size, but rather to move the curve of particle size distribution toward smaller sizes, each particle size being progressively reduced. Furthermore the grinding method has the disadvantage of discoloring the clay, especially in the case of the severe treatment required to completely grind or reduce the oversize.

I have, however, devised a novel method whereby the oversize particles of clay may be substantially completely removed, and which in no way changes the particle sizes of the other particles present in the clay such as takes place in a grinding operation (for example a pebble mill) as explained above. Moreover this method requires inexpensive apparatus, is economical to operate, and because of its production of clay of a quality heretofore incapable of being produced, will find wide use in clay refining.

The method I employ is to pass clay, preferably in liquid suspension, through a plated fine mesh wire cloth such as described in my copending application Serial No. 420,794, filed January 14, 1930. As explained therein, commercial screening practice has heretofore been confined to wire cloth of 150 mesh or approximately 200 mesh in some cases. Only rarely have finer meshes been used owing both to frailty of the wire cloth in the fine meshes as well as to the cost. However by using my new plated fine mesh wire cloth it is now feasible to pass materials commercially through cloth with openings corresponding to meshes finer than any hitherto commercially used and even finer than any hitherto made. Thus I may pass my clay through a plated fine mesh wire cloth with openings approximately .001" or somewhat less. This would correspond to a wire cloth of 575 mesh, which is finer than any wire cloth which to my knowledge has hitherto been made.

I may use any convenient screening apparatus equipped with my plated fine mesh wire cloth for the purpose, but I have found that the gyratory riddle screen pan disclosed in my application Serial No. 359,943 filed May 2, 1929, is particularly suitable.

My process may be carried out in conjunction with present processes for the refining of clay, or it may be used as the only process employed for this purpose. It is thus suitable to suspend the clay in water, rid it of its larger particles through the medium of elutriation and then pass it through my plated fine mesh wire cloth, or it may be subjected to my process without preliminary elutriation. In the latter case, of course, there is more wear on the cloth due to the fact that there is a great deal more material rejected on the cloth than is the case when my process is carried out on already elutriated material.

Likewise my process may be carried out in conjunction with air flotation, for example after the clay has been air floated, but this is not usually such a convenient method of carrying it out owing to the fact that the clay is preferably in liquid suspension when passed through my fine mesh plated wire cloth. It is possible to pass dry clay through my fine mesh plated wire cloth but this is a much slower and more costly procedure than passing it through when in a liquid suspension.

The characteristics of clay processed by my method are novel and well defined, namely, the particle size of the particles remaining have been unchanged, and it differs from ordinary commercial clay only by the fact that the oversize has been substantially removed. In certain cases where plated wire cloth with openings of less than .001" has been employed, certain of the larger particles below the size of the oversize will also be removed. It is to be particularly noted that there is no reduction of the particle size of the material remaining such as results from any grinding operation, which reduction is a disadvantage in many cases, and likewise that the color of the clay has not been lowered, but on the contrary is in many cases enhanced due to the fact that off-colored oversize has been removed. This latter point is very often of great importance as the color of clay has a great influence on its economic value. It will thus be seen that my improved clay has qualities different from any heretofore produced and is characterized: (1) by the fact that the particle size distribution has been limited by the substantial elimination of the oversize without substantially any change taking place in the particle size of the material remaining; (2) by the fact that the proportions of the various particle sizes remaining have been substantially unchanged one to the other; and (3) by the fact that in certain cases its color has been improved.

The plated fine mesh wire cloths used, extending the practical range of separation of fine particles as they do, I have termed "ultra wire cloths". My novel clay processed therethrough as herein described and/or possessing the characteristics herein described I have termed "ultra clay".

I have found that paper filled with ultra clay possesses superior printing qualities, takes a better finish, and takes a more uniform finish, contains substantially no "shiners" and is in general of a better quality than paper filled with ordinary clay. Such improved paper may be sized such as rosin size, paraffin emulsions or the like, as shown for example in my prior patents Nos. 1,803,642, 1,803,645, 1,803,650, 1,803,651 and 1,803,652, all issued May 5, 1931, with suitable sizing or may be unsized as desired. The ultra clay used therein may be distributed substantially uniformly throughout.

Likewise I have found that paper coated with ultra clay (mixed with a suitable adhesive, of course, such as the customary adhesives ordinarily employed for the purpose, for example, casein, as disclosed (among other places) by Belle in his article on page 445 of the January 1, 1925 issue of "Paper", and with or without other mineral pigments as desired) is more uniform in finish, in certain cases can be made with less adhesive, thereby having the double advantage of more economical production and higher surface gloss, prints more evenly, and is particularly marked by absence of the so-called "shiners".

As my novel clay, i. e. ultra clay, is relatively inexpensive to produce, it will be apparent that it will result in the production of improved quality filled and coated papers made therewith.

It will be apparent that it is not possible to produce a fine mesh wire cloth as a base cloth for plating with all the openings absolutely uniform in size. For this reason, if it be desired to produce clay substantially free from oversize, it will be apparent that the average cloth opening must necessarily be somewhat less than approximately .001", in order that the maximum opening may not be greater than approximately .001". As ultra wire cloths decrease markedly in capacity as their size of opening decreases, it is sometimes desirable from the standpoint of economy, in order to increase the capacity of the screening apparatus, to use ultra wire cloths with openings of such size that they do not remove the oversize completely, for example ultra wire cloths with openings averaging approximately .001" or in certain cases slightly larger.

Thus, although it is theoretically and practically desirable to remove all the oversize, nevertheless I have found that the reduction of oversize from that amount normally occurring to approximately .5% greatly improves the quality of clay. (The amount of oversize usually occurring in commercially treated clays ranges approximately from 2 to 4% or more, but in the case of certain extremely high grade commercially treated clays may run as low as .8% by weight on the weight of the clay). Although clay produced by my process and containing approximately only .5% of oversize is not of such good quality as clay from which the oversize has been substantially completely removed, nevertheless I have found that clay containing not more than .5% oversize (the larger oversize of course being substantially removed and the oversize remaining thus representing only the smaller oversize) is of a quality markedly superior to clay heretofore produced, and produces substantially improved filled and coated paper which in certain cases where cost is all important meets the requirements satisfactorily; and therefore such improved clay is meant to be included in my term "ultra clay".

Where I use the word "paper" herein I use it in the broad sense to include products of manufacture of all weights and thicknesses, which contain as an essential constituent a considerable amount of prepared fibre and which are capable of being produced on a Fourdrinier, cylinder, or other forming, felting, shaping or molding machine.

While I have described in detail the preferred embodiment of my invention it is to be understood that my invention may be varied considerably within the limitations required by the disclosures of the prior art without departing from the spirit of my invention or the scope of the subjoined claims.

I claim:

1. The method of producing improved clay from clay having particles of various sizes including oversize particles, which comprises reducing the quantity of the particles exceeding .001" in greatest dimension, to an amount not exceeding approximately .5% by weight of the total clay, and maintaining the other particles in substantially the same size as are such particles in the clay employed in producing said improved clay.

2. The method of producing improved clay from clay having particles of various sizes including oversize particles, which comprises reducing the quantity of the particles exceeding .001" in greatest dimension, to an amount not exceeding approximately .5% by weight of the total clay, and maintaining the other particles in substantially the same size and in substantially the same proportion one to another as are such particles in the clay employed in producing said improved clay.

3. The method of producing improved clay from clay having particles of various sizes including oversize particles, which comprises substantially eliminating particles exceeding .001" in greatest dimension, while maintaining the other particles in substantially the same size as are such particles in the clay employed in producing said improved clay.

4. The method of producing improved clay from clay having particles of various sizes including oversize particles, which comprises substantially eliminating particles exceeding .001" in greatest dimension and maintaining the other particles in substantially the same size and in substantially the same proportion one to another as are such particles in the clay employed in producing said improved clay.

5. The method of producing filled paper comprising fibrous material and improved clay produced from clay having particles of various sizes including oversize particles, which comprises reducing the quantity of the particles exceeding .001" in greatest dimension, to an amount not exceeding approximately .5% by weight of the total clay, and maintaining the other particles in substantially the same size as are such particles in the clay employed in producing said improved clay, and adding said improved clay to said fibrous material.

6. The method of producing filled paper comprising fibrous material and improved clay prepared from clay having particles of various sizes including oversize particles, which comprises reducing the quantity of the particles exceeding .001" in greatest dimension, to an amount not exceeding approximately .5% by weight of the total clay, and maintaining the other particles in substantially the same size and in substantially the same proportion one to another as are such particles in the clay employed in producing said improved clay, and adding said improved clay to said fibrous material.

7. The method of producing filled paper comprising fibrous material and improved clay produced from clay having particles of various sizes including oversize particles, which comprises substantially eliminating particles exceeding .001" in greatest dimension, while maintaining the other particles in substantially the same size as are such particles in the clay employed in producing said improved clay, and adding said improved clay to said fibrous material.

8. The method of producing filled paper comprising fibrous material and improved clay prepared from clay having particles of various sizes including oversize particles, which comprises substantially eliminating particles exceeding .001" in greatest dimension, and maintaining the other particles in substantially the same size and in substantially the same proportion one to another as are such particles in the clay employed in producing said improved clay, and adding said improved clay to said fibrous material.

9. The method of producing coated paper comprising fibrous body stock and a coating comprising adhesive and improved clay produced from clay having particles of various sizes including oversize particles, which comprises reducing the quantity of the particles exceeding .001" in greatest dimension, to an amount not exceeding approximately .5% by weight of the total clay, and maintaining the other particles in substantially the same size as are such particles in the clay employed in producing said improved clay, and applying said improved clay and said adhesive to said fibrous body stock.

10. The method of producing coated paper comprising fibrous body stock and a coating comprising adhesive and improved clay prepared from clay having particles of various sizes including oversize particles, which comprises reducing the quantity of the particles exceeding .001" in greatest dimension, to an amount not exceeding approximately .5% by weight of the total clay, and maintaining other particles in substantially the same size and in substantially the same proportion one to another as are such particles in the clay employed in producing said improved clay, and applying said improved clay and said adhesive to said fibrous body stock.

11. The method of producing coated paper comprising fibrous body stock and a coating comprising adhesive and improved clay produced from clay having particles of various sizes including oversize particles, which comprises substantially eliminating particles exceeding .001" in greatest dimension, while maintaining the other particles in substantially the same size as are such particles in the clay employed in producing said improved clay, and applying said improved clay and said adhesive to said fibrous body stock.

12. The method of producing coated paper comprising fibrous body stock and a coating comprising adhesive and improved clay prepared from clay having particles of various sizes including oversize particles, which comprises substantially eliminating particles exceeding .001" in greatest dimension, while maintaining the other particles in substantially the same size and in substantially the same proportion one to another as are such particles in the clay employed in producing said improved clay, and applying said improved clay and said adhesive to said fibrous body stock.

13. Improved clay produced from clay having particles of various sizes including oversize particles, characterized by the fact that it does not contain in excess of .5% by weight of the total clay of particles exceeding .001" in greatest dimension, and that the other particles are of substantially the same size as are such particles in the clay employed in producing said improved clay.

HAROLD ROBERT RAFTON.